United States Patent
Andrews et al.

(10) Patent No.: US 7,037,618 B2
(45) Date of Patent: May 2, 2006

(54) APPARATUS AND METHOD FOR COMPRESSING A STACK OF ELECTROCHEMICAL CELLS

(75) Inventors: Craig C. Andrews, College Station, TX (US); Rattaya Chow Yalamanchili, College Station, TX (US); Oliver J. Murphy, Bryan, TX (US)

(73) Assignee: Lynntech, Inc., College Station, TX (US)

( * ) Notice: Subject to any disclaimer, the term of this patent is extended or adjusted under 35 U.S.C. 154(b) by 386 days.

(21) Appl. No.: 10/446,030

(22) Filed: May 27, 2003

(65) Prior Publication Data

US 2003/0232233 A1 Dec. 18, 2003

Related U.S. Application Data

(60) Provisional application No. 60/386,664, filed on Jun. 5, 2002.

(51) Int. Cl.
*H01M 8/02* (2006.01)
*H01M 2/02* (2006.01)

(52) U.S. Cl. .......................... 429/37; 429/66; 429/152
(58) Field of Classification Search .................. 429/37, 429/38, 66, 152, 153, 154, 155
See application file for complete search history.

(56) References Cited

U.S. PATENT DOCUMENTS

| | | | |
|---|---|---|---|
| 4,020,244 A | 4/1977 | Selinko | 429/96 |
| 4,345,009 A | 8/1982 | Fahle et al. | 429/37 |
| 4,800,008 A | 1/1989 | Detournay et al. | 204/253 |
| 5,037,711 A | 8/1991 | Bonnaud et al. | 429/156 |
| 5,484,666 A | 1/1996 | Gibb et al. | 429/34 |
| 5,789,091 A | 8/1998 | Wozniczka et al. | 429/12 |
| 5,935,725 A * | 8/1999 | Dhar et al. | 429/38 X |
| 6,040,072 A | 3/2000 | Murphy et al. | 429/12 |
| 6,190,793 B1 * | 2/2001 | Barton et al. | 429/37 X |
| 6,200,698 B1 | 3/2001 | Carlstrom, Jr. | 429/34 |
| 6,270,917 B1 * | 8/2001 | Maeda et al. | 429/37 |
| 6,361,895 B1 | 3/2002 | Itou et al. | 429/34 |
| 6,696,193 B1 * | 2/2004 | Bonk et al. | 429/37 X |
| 2003/0235741 A1 * | 12/2003 | Richardson et al. | 429/34 |

FOREIGN PATENT DOCUMENTS

| WO | WO99/0446 | 1/1999 |
|---|---|---|
| WO | WO/02/052669 A2 | 7/2002 |

* cited by examiner

*Primary Examiner*—Stephen J. Kalafut
(74) *Attorney, Agent, or Firm*—Streets & Steele; Jeffrey L. Streets (57) ABSTRACT

An electrochemical cell comprising a plurality of electrochemical cell components having at least one opening extending therethrough. At least one filament extends through the at least one opening and has two ends with first and second securing members coupled to the two ends. A biasing member is disposed to put the at least one filament in tension between the securing members and to put the plurality of electrochemical cell components in compression. The filament is preferably electronically insulating and preferably does not transmit torsional forces. The filament extends through the at least one opening at least one time and may loop around a securing member any number of times. The filament may have a finite cut length or may form a continuous filament loop.

32 Claims, 6 Drawing Sheets

FIG. 17 ically non-conductive, such as a composite material
APPARATUS AND METHOD FOR COMPRESSING A STACK OF ELECTROCHEMICAL CELLS This application claims priority to U.S. Provisional Patent Application No. 60/386,664 filed on Jun. 5, 2002.

FIELD OF THE INVENTION

The present invention relates to devices and techniques for the assembly and compression of electrochemical cells and cell stacks.

BACKGROUND OF THE INVENTION

Conventional construction of fuel cell and electrolyzer stacks, especially proton exchange membrane (PEM) stacks, require a large number of flat components (including bipolar plates, membrane and electrode assemblies, and, optionally, cooling plates) to be assembled between a pair of heavy metal endplates. The entire assembly is placed in compression through the use of a series of long threaded metal rods (tie rods) extending from one endplate of the assembly to the other endplate with nuts or other fasteners on either end.

A conventional electrochemical cell stack has a plurality of cells disposed between two endplates. The cell stack and endplates are compressed by extending metal rods from one endplate to the other endplate and fastening the ends of the rods, such as with bolts. This type of design is often referred to as a "filter press" design. While conventional "filter press" designs may be straight-forward, and effective, they are also bulky and heavy. In conventional "filter press" designs the entire load is applied by the bolts along the edges of the stack. In order to compress the stack as evenly as possible over the cross-sectional area of the stack without bending the end plates, the endplates are made very thick. While increasing the thickness of the end plates may help make them rigid, increasing endplate thickness results in an increased total weight of the electrolyzer stack. Another contributing factor to the increased weight in the "filter press" design is the placement of the tie rods around the perimeter of the active portion of the stack, thereby requiring endplates that are even larger in area than the stack.

The size of the metal end plates can be marginally reduced by placing the metal tie rods inside of gas passages. While this type of design allows reduction in electrolyzer stack-weight, the reduction is limited by the continuing need for heavy metal tie rods and endplates in this type of design. Furthermore, placing the metal tie rods within the gas passages or manifold promotes corrosion of the tie rods and allows electrolysis to occur along the tie rods because of the difference in potential between the tie rods and the electronically conducting components of the individual cells.

Another approach to stack compression is disclosed by Gibb et al. in U.S. Pat. No. 5,484,666. Here, the electrochemical cells have manifolds that extend through the membrane and electrode assemblies or active area of the cells and the metal tie rods are disposed within these manifolds. The primary benefit of this configuration is that the compression is more evenly distributed over the central portion of the cell so that the endplate thickness can be reduced. However, this marginal reduction in weight comes at the expense of complicating the design and manufacture of the active area. Furthermore, the tie rods take up a significant amount of the cross-sectional area of the manifold, requiring a corresponding increase in the manifold area. In order to accommodate this configuration while achieving a specified level of cell performance requires a corresponding increase in the overall dimensions of the active area.

Yet another approach is disclosed by Barton et al. in U.S. Pat. No. 6,190,793. This patent discloses an electrochemical fuel cell stack with an improved compression assembly comprising a tension member that is preferably rigid and electrically non-conductive, such as a composite material having a bonding agent and reinforcing fibers. In one embodiment, the compression assembly employs a collet and wedges to grip the tension member and compress a resilient member that imparts a tensile force to the tension member and compressive force to the fuel cell assemblies. While the composite materials disclosed by Barton et al. are lighter in weight than metal and avoid contamination of the cell through the introduction of metals, the tension member does not serve to reduce the overall cell dimensions.

Therefore, there is a need for a system that compresses stacks that allows minimal overall dimensions of the stack. Furthermore, it would be desirable to have a compression system that does not taking up so much of the volume of the stack. It would be desirable if the compression assembly could be placed within internal passages of the cell, such as the manifolds, without blocking the flow channels to the individual cells.

SUMMARY OF THE INVENTION

The present invention provides an electrochemical cell comprising a plurality of electrochemical cell components having at least one opening extending therethrough. At least one filament extends through the at least one opening and has two ends with first and second securing members coupled to the two ends. A biasing member is disposed to put the at least one filament in tension between the securing members and to put the plurality of electrochemical cell components in compression. The at least one opening may be either open or closed to the atmosphere and may form a manifold. If the opening is closed to the atmosphere, then the securing member, such as an acorn nut, may include means for sealing the end of the opening. Typically, the plurality of electrochemical cell components will have a plurality of openings extending therethrough. The plurality of openings may, for example, be disposed across the active area of the electrochemical cells or disposed around the active area of the electrochemical cells.

The filament is preferably electronically insulating and preferably does not transmit torsional forces. The filament extends through the at least one opening at least one time and may loop around a securing member any number of times. The filament may have a finite cut length or may form a continuous filament loop. Accordingly, the "ends" of a continuous filament loop are the two distal portions of the loops. The filament itself may be an integral filament or have a structure that is woven.

The securing members should have a smooth surface or channel for receiving the at least one filament without damaging the at least one filament. The securing member may be as simple as a retainer pin for receiving a loop or may be configured to secure a cut end of the filament, such as through a mechanism selected from a tapered plug, com cleat, threadless nut, and combinations thereof.

The biasing member is preferably disposed between a securing member and the plurality of electrochemical cell components, but may be disposed among the plurality of electrochemical cell components. The biasing member is preferably selected from a spring, resilient pad, Belleville washer, hydraulic cylinder, pneumatic cylinder, bellows, and combinations thereof. Exemplary springs are preferably selected from a wavy spring, a tension spring, a compression spring, and combinations thereof. Preferably, the spring has the same shape as the opening through the plurality of electrochemical cell components.

Most preferably, the plurality of components comprise an endplate having an opening therethrough in alignment with the at least one opening through the plurality of electrochemical cell components. In certain embodiments, the endplate is adapted to receive the securing element or to receive the biasing member, such as with a ridge or groove formed around the manifold opening.

Optionally, a length adjustment member may be disposed in series with the filament and the biasing member. For example, the length adjustment member may be selected from a ratchet, a turnbuckle, and combinations thereof.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention provides a method and apparatus for compressing a plurality of electrochemical cell components. Primarily, it is necessary to compress these components either to prevent leakage of fluids between adjacent components or to improve the electrical contact between adjacent components. The present method and apparatus for compressing electrochemical cell components may be used alone or in combination with other methods that prevent leakage of fluids or improve electrical contact between components. For example, the invention may be used in combination with gaskets, sealants, adhesives and the like in order to reduce fluid leakage from the cell components. Furthermore, the present invention may be used in combination with techniques that improve electrical conductivity or decrease contact resistance between components, such as metallurgical bonding of components, the use of unitized structures, and enhanced use of electrically conducting materials.

The exact nature of the electrochemical cell components that are being compressed is not a limiting factor of the present invention. In particular, it should be recognized that new electrochemical cell components or new combinations of known electrochemical cell components may be compressed in accordance with the present invention without departing from the intended scope of the present invention. In particular, the electrochemical cell components may comprise a single cell or a plurality of electrochemical cells arranged in a stack. The components of a single cell or the components of a cell made part of a stack may include, without limitation, fluid flow field elements, gas diffusion elements, catalysts, proton exchange membranes, current collectors, cell frames, manifold structures, gaskets, sealants and adhesives, protective sheets and end plates. It should be recognized the where the electrochemical cell components make up a plurality of cells, particularly in a bipolar cell arrangement, the plurality of components may further include bipolar separator plates, fluid cooled bipolar separator plates or combinations thereof.

The filaments of the present invention are made from materials having a high tensile strength and are preferably flexible and electronically non-conducting. For example, the filaments may be made from Kevlar (an aromatic polyamide fiber made by Du Pont de Nemours, E. I. & Co., Wilmington, Del.) or a polymer-coated metallic wire. Furthermore, the filament may be a unitary filament or it may be a woven rope, cable or string consisting a number of strands. It is also necessary that the filaments be made from a material that can withstand the temperatures and chemicals, if any, to which it may be exposed in the operation of the electrochemical cell.

The filaments of the present invention may be used along an external surface of the plurality of electrochemical cell components, but more preferably are disposed through an internal passage formed through the plurality of components. The internal passage may pass through an active area of the cell, an inactive area of the cell, or a combination thereof. Accordingly, the internal passage may pass through components that form part of the active area of the cell, such as a membrane and electrode assembly, components that are not in the active area, such as a polymer cell frame, or some combination of active area and non-active area components. Furthermore, the internal passages that receive the filaments may be dedicated passages that have been provided for the sole purpose of receiving the filaments or the passages may be manifolds designed for the distribution or collection of fluids among the components of the one or more electrochemical cells. In order to avoid complicating the construction of the plurality of electrochemical cell components, it may be preferable to pass the filaments through the manifold passage since this passage is already provided through the components for other purposes. However, it must be recognized that disposing the filaments in the manifolds requires chemical compatibility with the manifold fluids and conditions, thermal compatibility with the manifold temperatures, as well as electrical non-conductivity in applications where filaments in the manifold may be exposed to electrically conductive components at different electrical potentials.

In order to compress the plurality of components, it is necessary for the opposing end portions of the filaments to be secured at opposing ends of the stack of components. The securing members may take many forms, but must have sufficient size and strength to avoid being pulled through the opening in the stack and to convey compressive forces to the stack. Exact configurations of the securing member may depend upon the amount of force the securing member must handle, whether the filament is in the form of a continuous loop or finite length, and how many times the filament contacts the securing member. However, t is important to eliminate sharp corners that could cut or deform the filament.

In accordance with the invention, one or more filaments may pass through the openings in the cell components any number of times. In one configuration a filament may pass the length of the passage and loop around a securing member in order to then pass back to a securing member other end of the passage. In this manner, a single filament may be made to make any number of passes between the two ends of the stack. Accordingly, if the filament forms a continuous loop, then the securing members at both ends may be as simple as a retaining pen around which separate portions of the filament loop may be secured. However, when the filament has a cut or finite length, it is important to recognize that the two ends of the filament must be secured in some manner. Therefore, the filament ends must be tied or otherwise secured to the securing members. Various means of securing a filament will be recognized by those in the art, but may include, without limitation, frictional engagement of the filament between two surfaces, bonding the filament to another portion of itself or to the securing member with adhesive, or, where the filament comprises a thermoplastic or metal, welding the filament to another portion of itself or to the securing member.

Optionally, the materials that make up the filament may be resilient and cause sufficient bias between the securing members to compress the stack. In this manner, the filament also serves as the biasing member. However, it is preferable to use a distinct and separate biasing member disposed to compress the components. The biasing member may be a spring, a Bellville washer, a resilient pad, a compression spring, a tension spring, a hydraulic actuator, a pneumatic actuator, bellows, or the like. In one embodiment, the biasing members is disposed between one securing member and an end plate forming the adjacent terminal end of the plurality of electrochemical cell components. Accordingly, the biasing member pushes against both the securing member and the endplate so as to place the filament in tension and the cell components in compression. Alternatively, the biasing member may be disposed between or within the electrochemical cell components or may be provided by one of the electrochemical cell components.

It is generally desirable to provide relatively uniform compression across the face or surface area of the electrochemical cell components. This may be accomplished with a single central compression assembly comprising a filament, two securing members and a biasing member, but using only a single compression assembly typically requires the use of heavy metal end plates or other rigid structures. More preferably, the invention will include the use of a plurality of compression assemblies disposed uniformly across the face of the stack or around a perimeter manifold area. However, it should be recognized that any arrangement of the compression assemblies suitable for maintaining appropriate fluid sealing and electrical conductivity will be sufficient.

In embodiments where the filaments are disposed in the manifolds, the securing members, and potentially the biasing members, may block or otherwise complicate the provision of external fluid connections to the manifolds. However, these complications may be dealt with in a variety of manners. For example, in applications where the manifold is simply vented to atmosphere, it may be sufficient that the securing member and biasing member do not block off the manifold or cause significant restriction to fluid flow. Where the manifold is pressurized or otherwise should not communicate with the atmosphere around the cell, an end cap may be provided over the securing member or provided integrally as part of the securing member so as to completely block off the manifold. In order to provide fluid communication between an external fluid supply or exhaust system and the manifold, such an end cap may include a fitting for coupling a tube or conduit to the supply or exhaust system. Furthermore, while it is generally preferred that the filaments be placed purely in tension, i.e., extend through a linear path, the fluids may communicate with the side of the manifold so as to avoid interference with the securing members.

It should further be recognized that the present invention is not limited to a one-to-one correspondence between filaments, securing members and/or biasing members. For example, a single filament may pass any number of times through several passages and be secured by a plurality of securing members. Similarly, a single biasing member or some smaller plurality of biasing members may be used to place tension on any number of filaments. Even further, it should be recognized that the number of filaments is also independent of any load-distributing elements that might be used to spread the compression across the face of a stack.

While the biasing members are responsible for compressing the plurality of components, it may be beneficial to assemble and compress the components by some other means while preparing the compression assemblies described herein. In this manner, any significant changes in the stacked height of the components can be taken up before securing the filaments in place, and the biasing member does not have to be designed to act over a large range of distance. However, it is still desirable for the biasing member to be resilient and apply appropriate compressive forces on the components over a range that represents normal expansion and contraction that the components will experience during operating cycles.

Optionally, a length adjustment member may be included to allow adjustment of the effective length of the filament. This member is beneficial to account for any deformation of the cell components to a dimension that falls outside the range of the biasing member. The most frequently observed deformations are stretching of tensile members or irreversible compression of the gaskets or other soft sealing components in the stack. Either of these deformations can cause a loss in compression, and possibly gas leakage. The length adjustment member may be adjusted periodically to a help maintain the assembly at a desired compression level.

The filament-based compression assemblies of the present invention present significant improvements over typical tie-rods. A primary advantage of the filaments is that the filaments have less cross-sectional area than rods, so that the filaments can be accommodated, either internally or externally, without requiring a corresponding increase in the size of the cell components. Even if the cumulative cross-sectional area of all the filaments exceeded the cumulative cross-sectional area of rods, the smaller diameter of individual filaments enables the filaments to be located or positioned in a manner that minimizes the necessary increase in the overall cell component dimensions. For example, a single rod having a diameter of 2 centimeters will have a cross-sectional area ($\pi r^2$) of about 3.14 square centimeters, whereas five equally-sized filaments providing the same cumulative cross-sectional area would have a diameter of 0.45 centimeters. Placing a 2 centimeter diameter rod into a manifold dictates that the manifold must have cross-sectional dimensions that are greater than 2 centimeters by an amount that accommodates the fluid flow in the manifold and avoids blocking the channels to the individual cells. By contrast, the five filaments that each have a diameter of 0.45 centimeters may be arranged so that the manifold may have a dimension that is less than 2 centimeters without sacrificing the performance of the manifold. Furthermore, the filaments may be intentionally positioned away from the channels to avoid blockage or in some other position(s) as the situation may require, such as improving the uniformity of the compression across the surface of the components.

The present invention may be used in a manner to apply a greater force over one portion of the stack, such as the central portion, than over another portion of the stack. Each of the compression assemblies may be designed to provide the desired force. The present invention also encompasses the ability to provide any desired pattern of compressive force on the stack.

Figure 1:
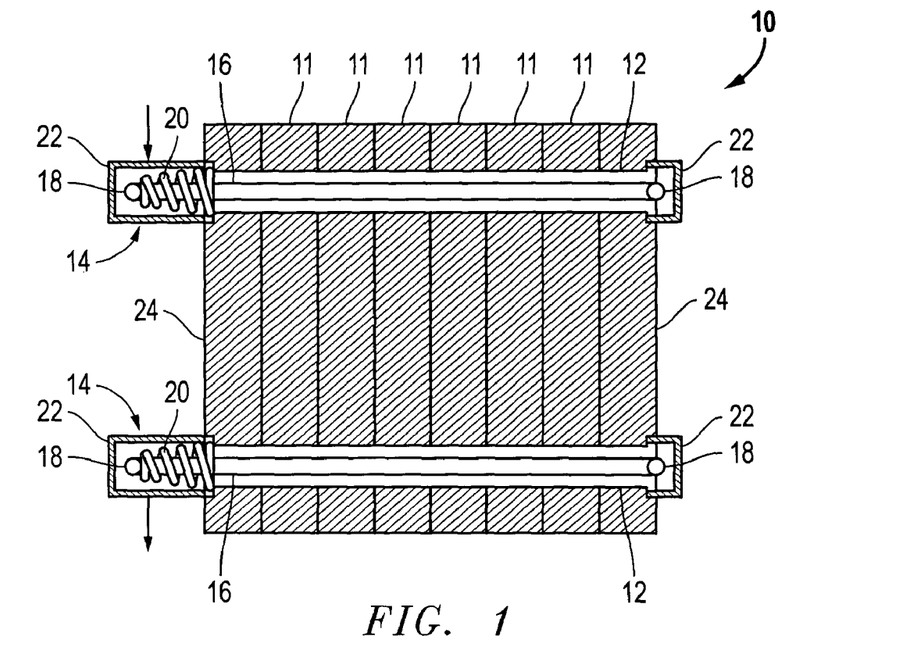
FIG. 1 is a cross-sectional side view of an electrochemical cell stack having a compression assembly with filaments extending through the manifolds.

FIG. 1 is a cross-sectional side view of an electrochemical cell stack 10 having a plurality of cells or cell components 11 and internal passages or manifolds 12 extending through the components. The stack 10 is compressed by a compression assembly 14 that includes filaments 16 extending through the manifolds, securing members 18, and biasing member or spring 20. The manifolds have been closed with caps 22 that are shown as being independently secured to the endplates 24.

Figure 2:
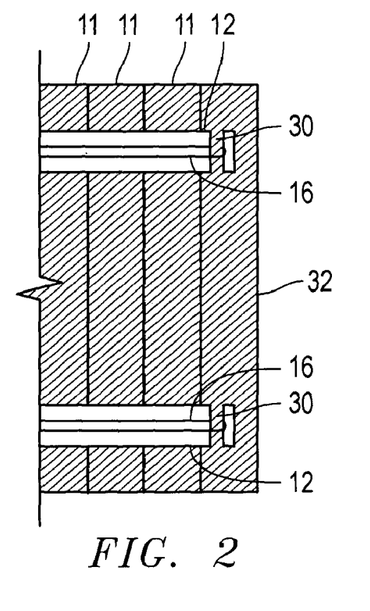
FIG. 2 is a cross-sectional side view of a securing member formed as part of an endplate.

FIG. 2 is a cross-sectional side view of a securing member 30 formed as part of an endplate 32. The filament 16 has been looped around the member 30 and extends through the manifold 12 to the opposing end of the manifold.

Figure 3:
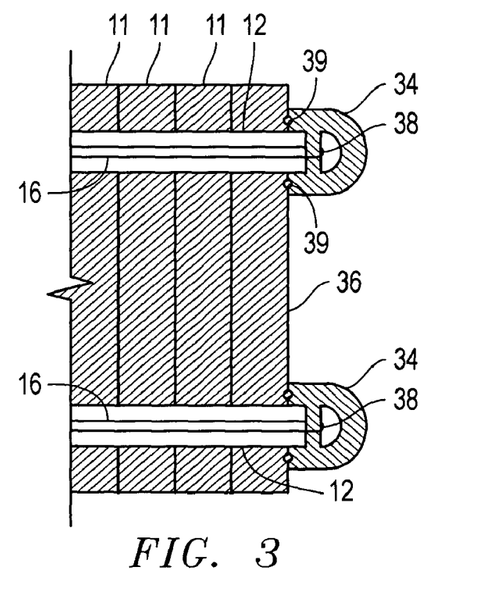
FIG. 3 is a cross-sectional side view of an alternative securing member formed separate from the endplate.

FIG. 3 is a cross-sectional side view of an alternative securing member 34 formed separate from the endplate 36. The securing member 34, otherwise referred to as an acorn, secures a loop 38 in the end of the filament 16. When tension is applied to the filament 16, the acorn 34 is pulled tight against the endplate 36 and forms a fluid-tight seal therebetween, preferably with the aid of an o-ring gasket 39.

Figure 4:
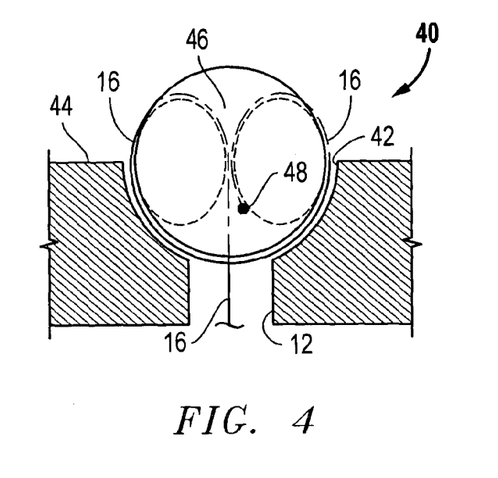
FIG. 4 is a partial cross-sectional diagram showing a securing member received in a recess or groove formed in an endplate.

FIG. 4 is a partial cross-sectional diagram showing a securing member 40 received in a recess or groove 42 formed in an endplate 44. The securing member 40 has a circular cross-section with a hole 46 through the center for receiving a filament 16. While the filament may be receiving by or tied to the member 40 is various manners, the filament 16 is shown passing upward through the hole 46, around and down the left side of the member, up and around the right side of the member, then back down through the hole 46. The filament has an end 48 that is knotted, melted into a ball, or welded back to the filament in order to prevent the end 48 from pulling back through the hole 46.

Figure 5:
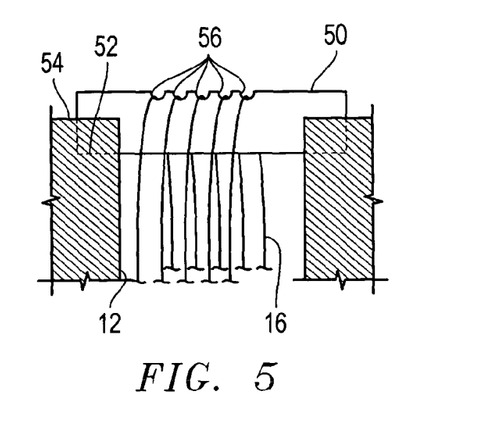
FIG. 5 is a partial cross-sectional diagram of a securing member, such as a simple pin, that receives a plurality of loops in the filament.

FIG. 5 is a partial cross-sectional diagram of a securing member 50, such as a simple pin, that receives a plurality of loops in the filament 16. The securing member 50 is received in a recess 52 formed in the endplate 54. The securing member has a plurality of grooves 56 for positioning the filament loops in a spaced side-by-side relationship.

Figure 6:
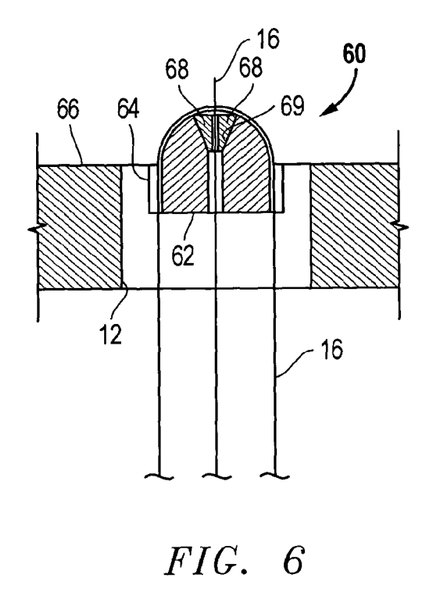
FIG. 6 is a cross-sectional side view of a securing member having a flat base received in a recess formed in the endplate.

FIG. 6 is a cross-sectional side view of a securing member 60 having a flat base 62 received in a recess 64 formed in the endplate 66. The filament 16 has a finite length (it is not a continuous loop) and is shown looping around the member 60 once, then being frictionally engaged by two resilient, split wedge members 68 received in a collet 69 formed in the member 60.

Figure 7:
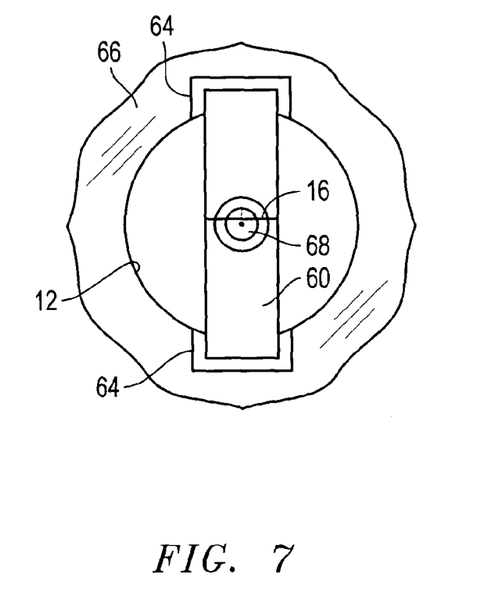
FIG. 7 is a top view of the securing member extending between the recesses formed in the endplate of FIG. 6.

FIG. 7 is a top view of the securing member 60 extending between the recesses 64 formed in the endplate 66 of FIG. 6. The securing member 60 spans across the manifold 12 to secure the filament 16 that extends through the manifold 12. While the configuration of the securing member 60 and the three passes of the filament 16 produces a substantially coplanar arrangement of the filament segments, it should be recognized that the securing member could arranged the filaments in any conceivable pattern across the cross-sectional area of the manifold and that such pattern need not be the same throughout the length of the stack.

Figure 8:
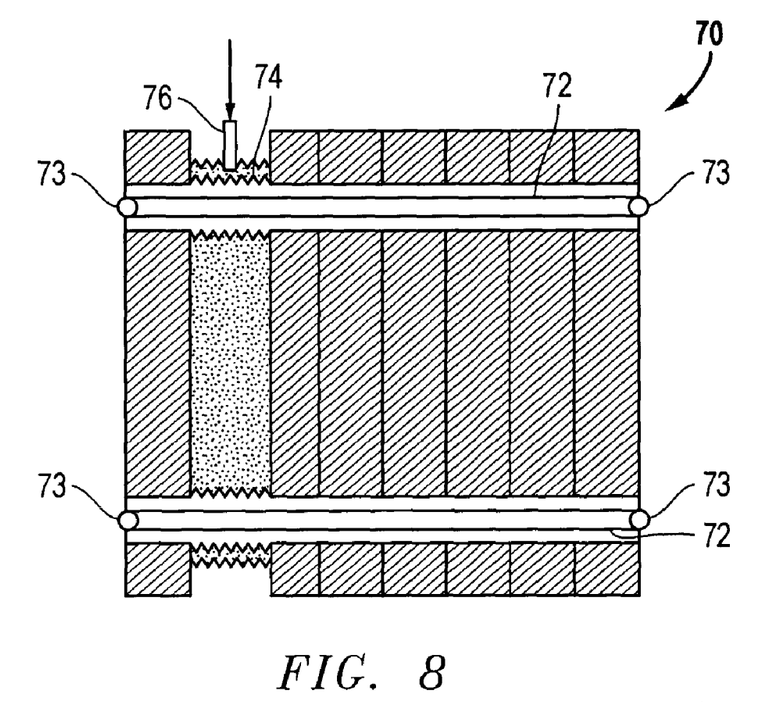
FIG. 8 is a cross-sectional side view of a further stack of electrochemical cell components secured by filaments and securing members, including an internal biasing member that is a fluid-pressurized bellows.

FIG. 8 is a cross-sectional side view of a further stack 70 of electrochemical cell components secured by filaments 72 and securing members 73, including an internal biasing member that is a fluid-pressurized bellows 74. The bellows 74 is coupled to a fluid pressure source through tube 76 in order to push against the adjacent components to apply tension on the filaments 72.

Figure 9:
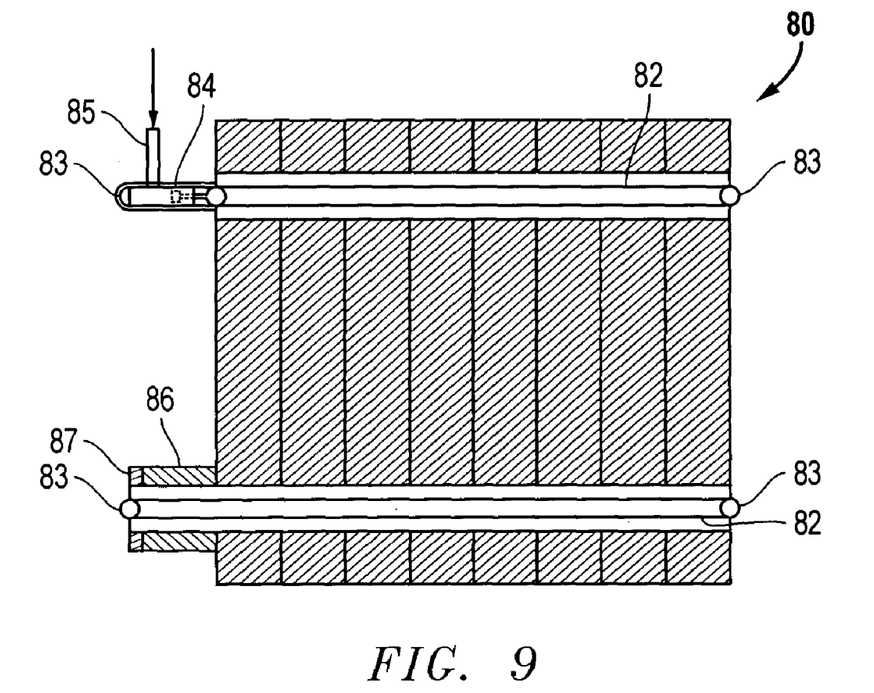
FIG. 9 is a cross-sectional side view of a still further stack of electrochemical cell components secured by filaments and securing members, including a hydraulic cylinder and a resilient block.

FIG. 9 is a cross-sectional side view of a still further stack 80 of electrochemical cell components secured by filaments 82 and securing members 73, including a first biasing member in the form of a hydraulic cylinder 84 and a second biasing member in the form of a resilient block 86. The hydraulic cylinder 84 has a port 85 in communication with an internal piston for receiving a pressurized fluid, preferably so that increasing the pressure to the cylinder results in greater compression of the stack and greater tension on the filaments 82. The resilient block 86 passively imparts a bias between the stack components and the adjacent securing member 83. Preferably, the resilient block is a polymer and has a metal protector 87 on the end for receiving the adjacent securing member 83. It should be recognized that the hydraulic cylinder 84 and the resilient block 86 are combined here for illustration purposes only, and that the stack of components may be compressed with one or a plurality of the compression assemblies, including any one type of biasing member or any combination of types of biasing members.

Figure 10:
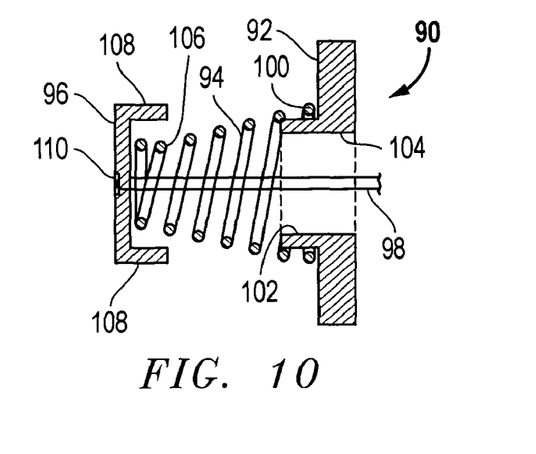
FIG. 10 is a cross-sectional diagram of one end of a compression assembly received against an endplate.

FIG. 10 is a cross-sectional diagram of one end of a compression assembly 90 received against an endplate 92.

Figure 11:
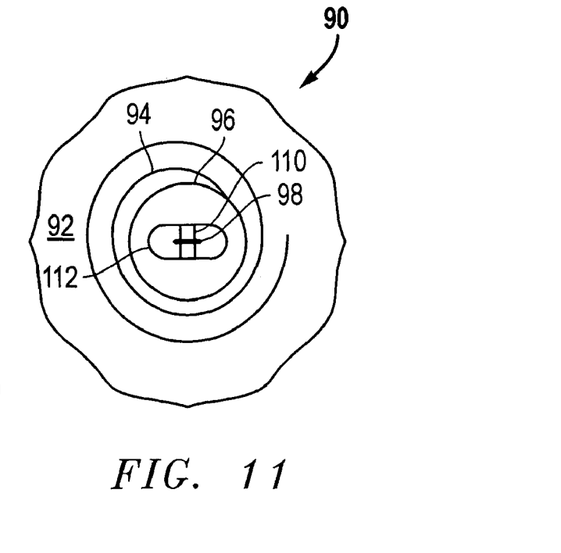
FIG. 11 is a top view of the compression assembly of FIG. 10.

The compression assembly 90 includes a coil spring 94, a securing member 96 and a filament 98. The coil spring 94 has a flared base end 100 that fits around a collar 102 extending from the endplate so that the spring is held in position about the opening in the manifold 104. The coil spring has a tapered end 106 that receives a securing member 96 having a rim 108 that keeps the securing member 96 in position relative to the spring 94, and hence the manifold 104. The filament 98 is looped around a pin 110 that extends across a hole 112 (See FIG. 11) in the center of the securing member 96. FIG. 11 is a top view of the compression assembly 90 of FIG. 10.

Figure 12:
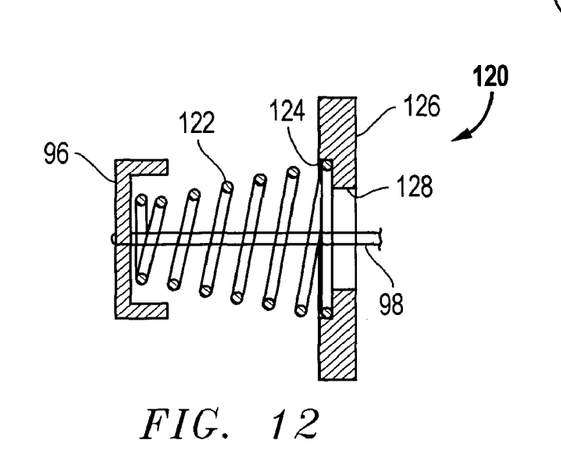
FIG. 12 is a cross-sectional diagram of one end of a compression assembly.

FIG. 12 is a cross-sectional diagram of one end of a compression assembly 120. The assembly 120 has a coil spring 122 received in a groove 124 formed in the endplate 126 around the manifold 128. A filament 98 is then secured to a securing member 96 similar to that shown in FIGS. 10 and 11.

Figure 13:
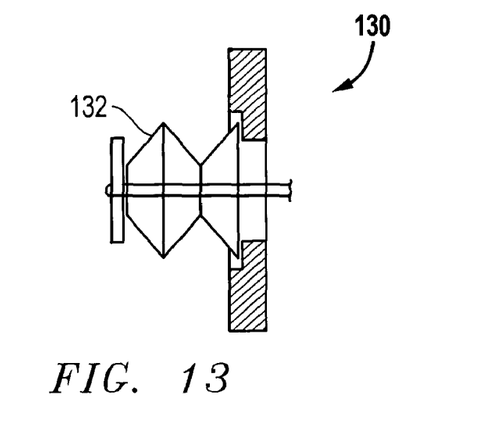
FIG. 13 is a cross-sectional diagram of one end of a further compression assembly that is similar in detail to the assembly of FIG. 12, except that a Belleville washer has been substituted for the coil spring.

FIG. 13 is a cross-sectional diagram of one end of a further compression assembly 130 that is similar in detail to assembly 120 of FIG. 12, except that a Belleville washer 132 has been substituted for the coil spring.

Figure 14:
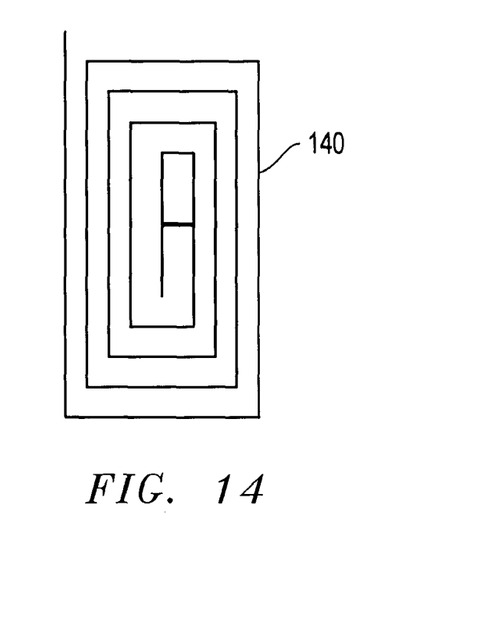
FIG. 14 is a top view of a square or rectangular tapered spring that may be used in the same manner and application as the springs shown in any of the present figures.

FIG. 14 is a top view of a square or rectangular tapered spring 140 that may be used in the same manner and application as the springs shown in any of the present figures. However, the use of a square or rectangular spring enables the spring to more easily straddle a square or rectangular opening to a manifold. It should be recognized that the shape of the manifold through the plurality of electrochemical cell components may have a different shape than the opening through the endplate.

Figure 15:
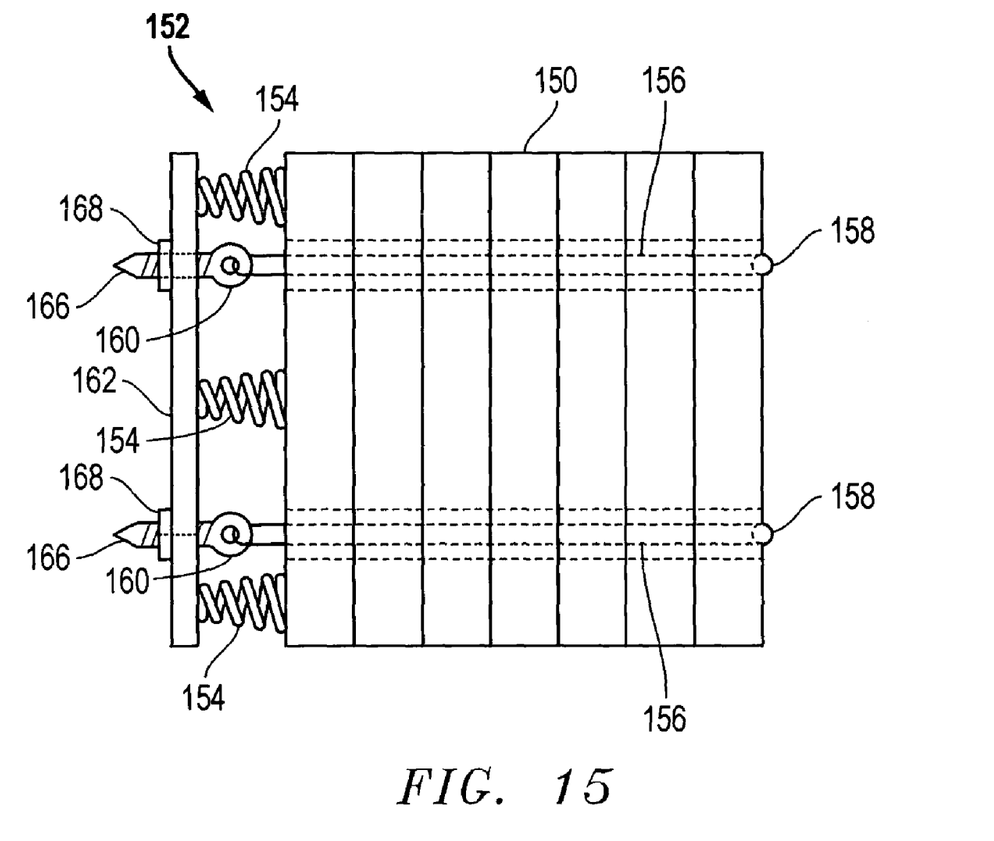
FIG. 15 is a schematic side view of an electrochemical cell stack secured by a compression assembly.

FIG. 15 is a schematic side view of an elevtrochemical cell stack 150 secured by a compression assembly 152. The assembly 152 has aplurality of biasing members, springs 154, and a plurality of filaments 156 extending through manifolds and secured between securing members 158, 160. This assembly includes a rigid member 162 that transmits forces between the plurality of springs 154 and the plurality of securing members/filaments 156, while allowing the number of springs and filaments to be either equal or not equal. A length adjustment member, here a threaded bolt 166 secured through the rigid member 162 to a nut 168, enables the effective length of the filament to be adjusted to increase or decrease compression of the springs. The threaded bolt 166 includes an eye 160 that serves as the securing member.

Figure 16:
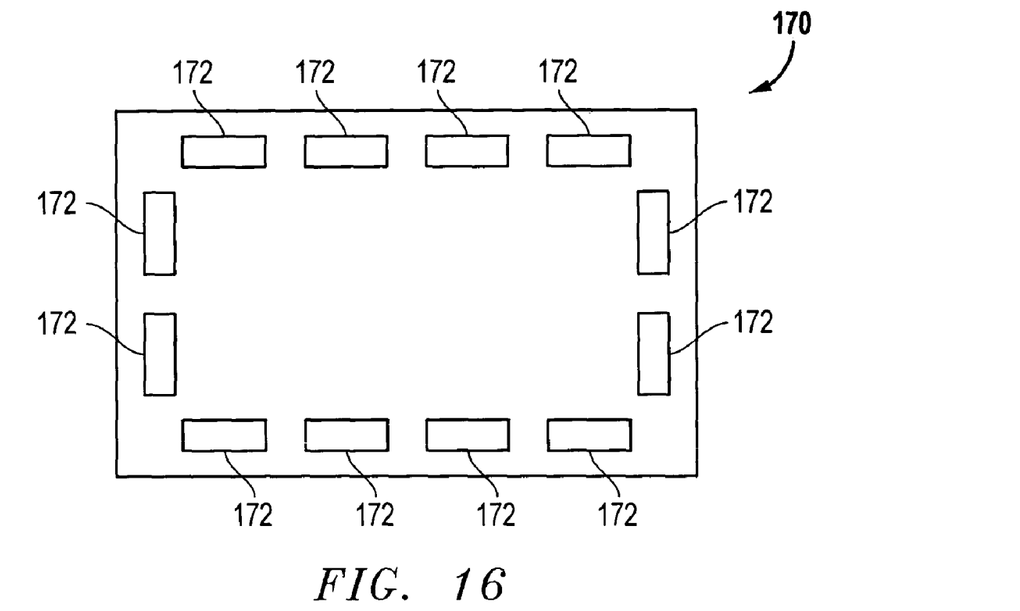
FIG. 16 is a schematic plan view of an electrochemical cell stack illustrating a possible arrangement of the manifolds and, therefore, a preferred arrangement of compression assemblies.

FIG. 16 is a schematic plan view of an electrochemical cell stack 170 illustrating a possible arrangement of manifolds 172 and, therefore, a preferred arrangement of compression assemblies.

Figure 17:
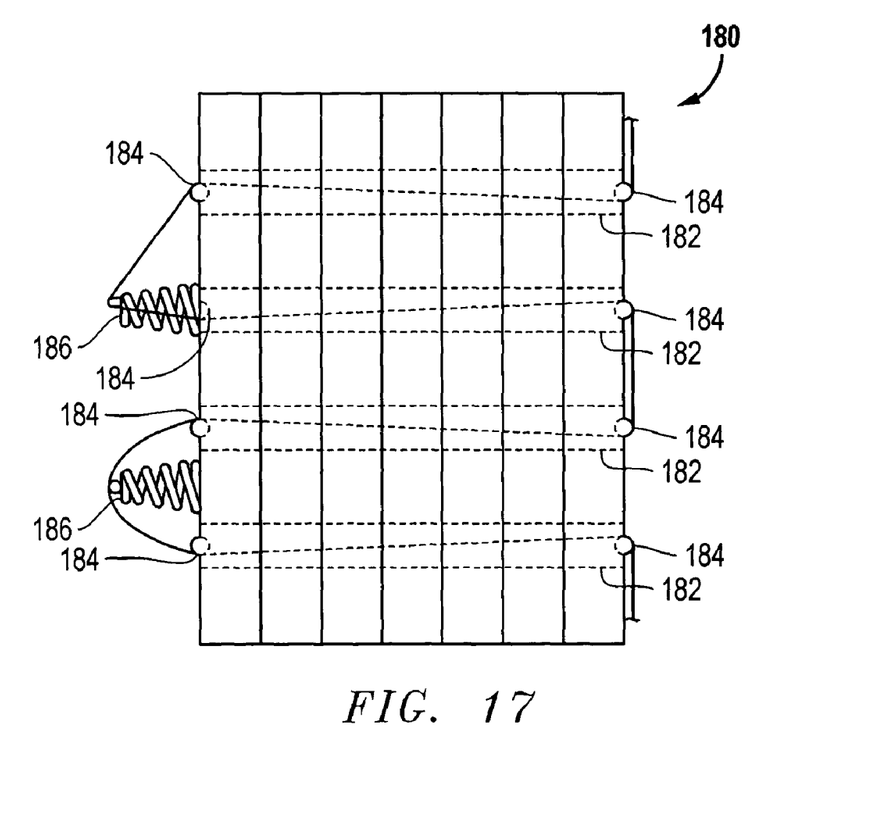
FIG. 17 is a schematic side view of an electrochemical cell stack having manifolds extending therethrough.

FIG. 17 is a schematic side view of an electrochemical cell stack 180 having manifolds 182 extending therethrough. Securing members 184 are positioned at the terminal ends of each manifold 182 so that a filament may be strung through the manifolds and between the manifolds in sequence. One or more biasing members 186 may be disposed in a manner that places the filament in tension and the components in compression.

While the foregoing is directed to preferred embodiments of the present invention, other and further embodiments of the invention may be devised without departing from the basic scope thereof, and the scope thereof is determined by the claims that follow.

What is claimed is:

1. An electrochemical cell comprising:
   a plurality of electrochemical cell components having at least one opening extending therethrough;
   at least one filament extending through the at least one opening and having two ends;
   first and second securing members coupled to the two ends of the at least one filament; and
   a biasing member disposed to put the at least one filament in tension between the securing members and to put the plurality of electrochemical cell components in compression.

2. The electrochemical cell of claim 1, wherein the at least one opening is open to the atmosphere.

3. The electrochemical cell of claim 1, wherein the at least one opening forms a manifold.

4. The electrochemical cell of claim 3, wherein the manifold is closed to the atmosphere.

5. The electrochemical cell of claim 4, wherein the securing member includes means for sealing the end of the opening through the plurality of electrochemical cell components.

6. The electrochemical cell of claim 5, wherein the securing member is an acorn nut.

7. The electrochemical cell of claim 1, wherein the at least one filament is electronically insulating.

8. The electromechanical cell of claim 1, wherein the at least one filament does not transmit torsional forces.

9. The electrochemical cell of claim 1 wherein the at least one filament has a structure that is woven.

10. The electrochemical cell of claim 1, wherein the at least one filament extends back and forth through the at least one opening.

11. The electrochemical cell of claim 1, wherein the at least one filament loops around a scouring member.

12. The electrochemical cell of claim 11, wherein the at least one filament comprises a continuous filament loop.

13. The electrochemical cell of claim 11, wherein the at least one filament forms a plurality of loops around a securing member.

14. The electrochemical cell of claim 1, wherein one of the at least one filament extends through a plurality of openings extending through the plurality of electrochemical cell components.

15. The electrochemical cell of claim 1, wherein the first and second securing members are selected from a tapered plug, corn cleat, threadless nut, and combinations thereof.

16. The electrochemical cell of claim 1 wherein the first and second securing members a smooth channel for receiving the at least one filament without damaging the at least one filament.

17. The electrochemical cell of claim 1, wherein the first and second securing members are retainer pine.

18. The electrochemical cell of claim 1, wherein the biasing member is selected from a spring, resilient pad, Belleville washer, hydraulic cylinder, pneumatic cylinder, bellows, and combinations thereof.

19. The electrochemical cell of claim 1, wherein the biasing member is a spring selected from a wavy spring, a tension spring, a compression spring, and combinations thereof.

20. The electrochemical cell of claim 1, wherein the biasing member has the same shape as the opening through the plurality of electrochemical cell components.

21. The electrochemical cell of claim 1, wherein the biasing member is disposed between a securing member and the plurality of electrochemical cell components.

22. The electrochemical cell of claim 1, wherein the biasing member is disposed among the plurality of electrochemical cell components.

23. The electrochemical cell of claim 1, wherein the plurality of components comprise an endplate having an opening therethrough in alignment with the at least one opening through the plurality of electrochemical cell components.

24. The electrochemical cell of claim 23, wherein the endplate is adapted to receive the securing element.

25. The electrochemical cell of claim 23, wherein the endplate is adapted to receive the biasing member.

26. The electrochemical cell of claim 25, wherein the endplate receives the biasing member with a ridge or groove formed around the manifold opening.

27. The electrochemical cell of claim 1, further comprising:
   a length adjustment member disposed in series with the filament and the biasing member.

28. The electrochemical cell of claim 1, wherein the length adjustment member is selected from a ratchet, a turnbuckle, and combinations thereof.

29. The electrochemical cell of claim 1, wherein the plurality of electrochemical cell components have a plurality of openings extending therethrough.

30. The electrochemical cell of claim 29, wherein the plurality of openings are disposed across the Thee of the electrochemical cells.

31. The electrochemical cell of claim 29, wherein the plurality of openings are disposed around the active area of the electrochemical cells.

32. The electrochemical cell of claim 11, wherein the two ends of the at least one filament are two distal portions of the loops.

* * * * *